United States Patent [19]

Beninate et al.

[11] 3,987,013

[45] Oct. 19, 1976

[54] FIRE RESISTANT ORGANIC PRODUCTS AND METHOD FOR PRODUCTION

[75] Inventors: John V. Beninate, Gretna; Donald J. Daigle, New Orleans; George L. Drake, Metairie; Wilson A. Reeves, Metairie; Darrell J. Donaldson, Metairie, all of La.

[73] Assignee: The United States of America as represented by the Secretary of Agriculture, Washington, D.C.

[22] Filed: Jan. 23, 1975

[21] Appl. No.: 543,704

Related U.S. Application Data

[62] Division of Ser. No. 258,165, May 31, 1972, Pat. No. 3,897,398, which is a division of Ser. No. 141,352, May 7, 1971, Pat. No. 3,697,316.

[52] U.S. Cl. .................. 260/77.5 AQ; 260/77.5 AR
[51] Int. Cl.² .......................................... C08G 18/00
[58] Field of Search ............ 260/77.5 AR, 77.5 AQ

[56] References Cited
FOREIGN PATENTS OR APPLICATIONS
743,644  9/1966  Canada ...................... 260/77.5 AR Primary Examiner—Lewis T. Jacobs
Attorney, Agent, or Firm—M. Howard Silverstein; Salvador J. Cangemi; David G. McConnell

[57] ABSTRACT

Methylol phosphines, methylol phosphines in combination with amine or amido compounds or water soluble adducts of these methylol phosphines and amides or amines when mixed and reacted with mono, di or polyisocyanates wherein the isocyanate groups are attached to carbon atoms are particularly valuable for the preparation of thermosetting flame resistant polymers. The polymers which are produced are cross-linked phosphorus and nitrogen containing polymers in which the reoccurring structure units each contain a phosphorus atom, that is a component of a radical of the group tris(methylene)-phosphine ($-CH_2)_3P$ and is linkd to at least one isocyanate radical by connecting urethane structure.

The polymer forming solutions are also valuable for the preparation of flame-, glow-, wrinkle- and shrink-resistant textiles by impregnating fabrics with these solutions and causing reaction and polymer formation by application of heat.

3 Claims, No Drawings

FIRE RESISTANT ORGANIC PRODUCTS AND METHOD FOR PRODUCTION

This is a division of Ser. No. 258,165, filed May 31, 1972, now U.S. Pat. No. 3,897,398, which in turn, is a division of Ser. No. 141,352, filed May 7, 1971, now U.S. Pat. No. 3,697,316.

This invention relates to new phosphorus and nitrogen containing polymers, processes for their production, and processes of employing these polymers in the flameproofing of certain organic fibrous material on mixture of various fibers.

In general, this invention relates to polymers capable of being produced by the reaction of a methylol phosphine compound of the formula

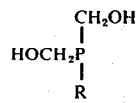

where P is trivalent, R is a $HOCH_2-$, $H-$, alkyl, aryl or alicyclic group with a monomeric nitrogen compound which contains one, two, or three isocyanate or isothiocyanate radicals; and to processes of reducing the combustibility of fibrous organic materials. The preferable methylol phosphine for use in this invention is where R is a $-CH_2OH$ group. When R is a $-CH_2OH$ group the compound is a white crystalline solid M.P. 58° C and is soluble in water alcohol and other solvents. For purposes of the reaction, each isocyanate group can be considered difunctional as shown in the equation below.

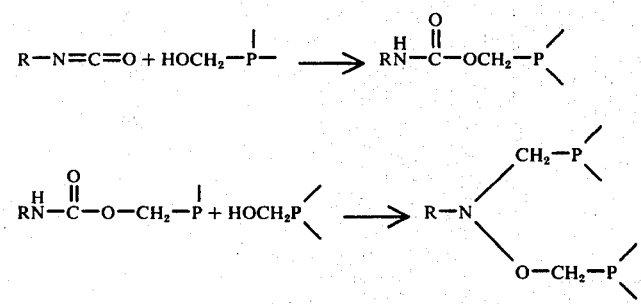

where R can be alkyl, aryl or alicyclic.

We have discovered that tris(hydroxymethyl)phosphine in the presence or absence of HCHO reacts with monomeric aliphatic, aromatic, and cyclic compounds containing at least one members of the group isocyanate radicals, attached to carbon atoms, to produce polymers. The polymers which are produced are cross-linked phosphorus and nitrogen containing polymers in which the reocurring structure units each contain a phosphorus atom, that is a component of a radical of the group tris(methylene)phosphine $[(-CH_2)_3P]$ and is linked to at least one isocyanate radical by the connecting urethane structure.

We have also discovered that compounds which contain at least one isocyanate radical attached to a carbon atom react with adducts of methylol phosphine (e. g. compounds that contain at least two $HOCH_2-$ groups attached to a trivalent phosphorous atom) and compounds such as melamine, methylolmelamines, cyanamide, urea, thiourea and the like, and by heating form thermosetting polymers which are flame-, rot- and mildew-resistant.

The soluble methylol phosphine adducts are prepared by reacting tris(hydroxymethyl)phosphine either in the presence or absence of free formaldehyde with an essentially monomeric amide or amine in a suitable solvent. In order to make the soluble and useful adducts of this invention there must be an excess of methylol phosphorus radicals ($-P\ CH_2OH$) in the adduct. For purposes of the reaction tris(hydroxymethyl)-phosphine is trifunctional, the functionality of the amine or amide is determined by the number of hydrogen or methylol radicals attached to trivalent nitrogen in the compound to be reacted with tris(hydroxymethyl)-phosphine. Thus the adduct contains unreacted methylol phosphorus radicals. The adducts are essentially materials which contain the structure of the group consisting of:

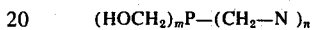

where $m$ and $n$ are integers of 1 or 2 and the sum of $m + n$ is 3. Polymers provided by this invention can be produced under acidic, neutral, and alkaline conditions.

Such polymers can be produced in the form of liquid or solid synthetic resins. Such resins can be deposited on the surfaces and/or in the interstices of hydrophilic fibrous organic materials, i.e., organic materials which absorb or adsorb water on most of their surface area. When such organic fiber materials are treated with such resins, they reduce the combustibility of the hydrophilic fibrous organic material and resist removal by laundering, drycleaning, and like chemical treatments.

Such resins can be deposited on the surface of nonhydrophilic materials to form flame-resistant coatings. In the case of mixed hydrophilic and hydrophobic fibers the resin can be deposited in and on the surface of the fibers. Such reactions provide valuable new processes and products. Suitable isocyanates which can be used in this invention have the typical structures RNCO or OCNR—NCO where R = H, alkyl or aryl or substituted alkyl or aryl groups. In the case of the aliphatic isocyanates such as hexamethylene diisocyanate, the reaction produces valuable new urethane polymers exhibiting to a rather widely variable controlled degree the properties of a thermosetting noncombustable polymer. Such polymers contain the phosphorus and nitrogen groups of the type described above.

In the case of monomeric aliphatic compounds containing at least one or two isocyanate radicals such as cyclohexadiisocyanate, the reaction produces valuable new flame resistant polymers containing aliphatic rings and the above described phosphorus and nitrogen groups.

In the case of a monomeric-aromatic compounds containing one or more members of the group which contain at least one or more isocyanate radicals such as toluene diisocyanate, the reaction produces valuable new flame-resistant polymers containing aromatic rings and the above described type of phosphorus and nitrogen groups.

Most of the above class of polymers exhibit the unique property of forming intumescent chars when exposed to a flame.

The polymers provided by this invention can be formed by reacting the phosphorus compound or adducts with a mixture of the isocyanate compounds.

Hydrophilic fibrous organic materials are rendered flame resistant by impregnating the material with dimethylformamide (DMF) solutions, or homogeneous dipersions of the respective monomers and curing the impregnated materials. Hexamethylenediisocyanate (HMDI) and toluene diisocyanate (TDI) are preferred members of the isocyanate compounds; and tris(hydroxymethyl)phosphine or its amine or amido adducts are preferred members of the phosphorus compounds.

The polymers provided by this invention can be produced in the form of hard brittle polymers, soft rubbery polymers, or semihard polymers. These products can be molded by the conventional techniques of molding thermosetting resins. These polymers are valuable materials for use in the production of molded synthetic plastic articles, such as buttons, food containers, electrical insulators, and the like; synthetic coatings, such as protective coatings and paints, varnishes and the like, having a reduced flammability due to the presence of some of the polymers, paper treating resins, textile resins, and the like.

Condensation polymers of tris(hydroxymethyl)phosphine or the amine or amido adduct with the isocyanate or isothiocyanates are preferably prepared by agitating a mixture of the phosphorus compounds and the isocyanate compound in DMF about from 28° C to about 150° C for periods of time ranging from 24 hours to about 3 minutes. The preferred relative amounts of phosphorus and nitrogen compounds used to polymerize can be calculated by conventional methods used for condensation polymerization by assuming that (1) tris(hydroxymethyl)phosphine is trifunctional, (2) one methylol group of the phosphorus compound condenses with one of the isocyanates or isothiocyanate radicals attached to a carbon atom of the isocyanate compound.

Each isocyanate group can be considered difunctional. For example, one and a half moles of the isocyanate can react with one mole of the tris(hydroxymethyl)phosphine. The preferred ratio of three tenths to three moles of the diisocyanate compound per mole of tris(hydroxymethyl)phosphine.

Tris(hydroxymethyl)phosphine and the amine or amido adducts will copolymerize with materials and are in themselves capable of polymerizing (e.g., diisocyanates) over an extreme wide range. For example, trace quantities of tris(hydroxymethyl)phosphine added to essentially 100% solution of HMDI will copolymerize with HMDI to produce a new phosphorus and nitrogen containing resin. The new nitrogen and phosphorus polymers are formed until the quantity of tris(hydroxymethyl)phosphine or the isocyanate are used up in the formation of the polymer.

Polymerization reactions conducted in accordance with the process of this invention can be carried to the extent of producing solid, liquid, or gel-like polymers. Partial polymers can be isolated, completing the polymerization or partially polymerized thermosetting monomers.

The mixed flame retardant provided by this invention can be used in the treatment of organic fibrous textile materials such as cotton, flax, linen, rayon, ramie, nylon and the like, as well as blends. Chemically modified fibers such as cyanoethylated, carboxymethylated and aminoethylated cottons and the like; regenerated cellulosic textiles such as the viscose rayons; or proteinatious textiles as silk, wool, and the like. The textile materials can be treated in the form of slivers, yarns or fabrics. Polymers contained in the mixed flame retardants can be separately formed or can be produced in situ in the textile by the reaction of the materials with which the textile is impregnated. The mixtures can be used as the only materials with which the textile is impregnated or used in conjunction with other textile flameproofing, creaseproofing, wrinkleproofing, and the like textile treating resins or agents; or in conjunction with textile lubricants, water repellents, and the like textile treating agents. In the treatment of textiles interfacial polymerization is a possibility.

Where a textile is being impregnated, it is of advantage to remove the excess impregnating liquid by passing the textile through squeeze rolls adjusted to apply a comparatively extremely high pressure prior to drying and curing the impregnated textile. It is also of advantage to dry the textile at a temperature of about from 85° C to about 180° C for about from 1 minute to about 6 minutes.

Although catalyst are not necessary to make this invention work any of the catalyst systems used in the preparation of durable press fabrics such as $MgCl_2$, $Zn(NO_3)_2$ or the amine hydrochlorides and the like could be used.

The degree of flameproofing imparted to a textile by these phosphorus and nitrogen resins can be varied from a low degree to a very high degree by varying the amount of polymer put in the fabric.

Some advantages of flameproofing textiles in accordance with this invention are as follows: Textiles treated by this process are flame resistant, glow resistant, rot- and mildew-resistant the effects of the treatment are permanent, and resistant to laundering, drycleaning, alkali and acid treatments. The polymers themselves are intumescent when exposed to the flame.

The following examples are illustrations of the invention:

EXAMPLE 1

Various organic fibrous materials were impregnated with solutions containing THP and aliphatic and aromatic diisocyanate and isocyanate compounds, dried for 1–3 minutes at 85° C to 105° C, and cured for 3–10 minutes at 120° C to 155° C. All of the treated fabrics with the exception of the nylon, formed a black carbonaceous char when exposed to flame, indicating the presence of phosphorus. The type of material treated, solution composition, dry and cure conditions, and properties of the treated materials are contained in the following table.

| Type of Organic Fibrous Material Treated | Soln. Used* | Drying Conditions Temp. °C | Drying Conditions Time Min. | Cure Conditions Temp. °C | Cure Conditions Time Min. | Match Angle Test ° | Hand | Strength | Color |
| --- | --- | --- | --- | --- | --- | --- | --- | --- | --- |
| Cotton twill fabric | A | 85 | 3 | 155 | 3 | 180 | Crisp | Fair | White |
| Polyester/cotton blend fabric | A | 85 | 3 | 120 | 10 | 180 | Crisp | Good | White |
| Wool fabric | A | 85 | 3 | 120 | 10 | 180 | Crisp | Fair | No change |
| Paper | A | 85 | 3 | 120 | 10 | 170 | Good | Good | White |
| Strip leather | A | 85 | 3 | 155 | 4 | 160 | No Chg | No Change | No change |
| Cotton Twill fabric | B | 85 | 3 | 155 | 3 | 90 | Crisp | Good | White |
| Polyester/cotton blend fabric | B | 85 | 3 | 155 | 3 | 90 | Fair | Good | White |
| Wool fabric | B | 85 | 3 | 155 | 3 | 180 | Crisp | Good | No change |
| Paper | B | 85 | 3 | 155 | 3 | 120 | Good | Good | White |
| Leather | B | 85 | 3 | 155 | 3 | 180 | No chg | No Change | No change |
| Nylon** | B | 85 | 3 | 155 | 3 | | Fair | Good | White |

*Description of solutions used:
A - 15 parts THP, 15 parts toluene diisocyanate, 70 parts dimethylformamide (DMF).
B - 7.5 parts THP, 7.5 parts toluene diisocyanate, 85 parts dimethylformamide.
**Nylon sample resisted burning and melted with the formation of black carbonaceous char containing phosphorus.

| Type of Organic Fibrous Material Treated | Soln. Used* | Drying Conditions Temp. °C | Drying Conditions Time Min. | Cure Conditions Temp. °C | Cure Conditions Time Min. | Match Angle Test ° | Hand | Strength | Color |
| --- | --- | --- | --- | --- | --- | --- | --- | --- | --- |
| Cotton twill fabric | C | 105 | 1 | 155 | 3 | 90 | Crisp | Good | White |
| Polyester/cotton blend fabric | C | 105 | 1 | 155 | 3 | 90 | Crisp | Good | White |
| Wool | C | 105 | 1 | 155 | 3 | 180 | Fair | Fair | No change |
| Paper | C | 105 | 1 | 155 | 3 | 135 | Good | Good | White |
| Leather | C | 105 | 1 | 155 | 3 | 180 | No chg | No change | No change |
| Cotton twill fabric | D | 105 | 1 | 155 | 4 | 90 | Fair | Good | White |
| Wool | D | 105 | 1 | 155 | 4 | 180 | Fair | Good | No change |
| Paper | D | 105 | 1 | 155 | 4 | 90 | Good | Good | White |
| Nylon** | D | 105 | 1 | 155 | 4 | | Good | Good | White |
| Polyester/cotton blend fabric | D | 105 | 1 | 155 | 4 | 90 | Good | Good | White |
| Cotton twill fabric | E | 85 | 2 | 155 | 3 | 160 | Crisp | Good | White |
| Polyester/cotton blend fabric | E | 85 | 2 | 155 | 3 | 160 | Crisp | Good | White |

*Description of solutions used:
C - 15 parts THP, 15 parts phenyl isocyanate, 70 parts dimethylformamide.
D - 7.5 parts THP, 7.5 parts phenyl isocyanate, 85 parts dimethylformamide.
E - 15 parts THP, 15 parts hexamethylene diisocyanate, 70 parts dimethylformamide.
**Nylon sample resisted burning and melted with the formation of black carbonaceous char containing phosphorus.

EXAMPLE 2

Various organic fibrous materials were impregnated with solutions containing THP-amine or amide adducts and aliphatic and aromatic diisocyanate and isocyanate compounds, dried for two minutes at 85° C, and cured for three minutes at 155° C. All of the treated fabrics were white in color, exhibited a crisp hand, and formed a black carbonaceous char when exposed to flame indicating the presence of phosphorus. The type of material treated, solution composition, dry and cure conditions, and properties of the treated materials are contained in the following table:

| Type of Organic Fibrous Material Treated | Soln. Used* | Match Angle Test ° | Strength |
| --- | --- | --- | --- |
| Cotton twill fabric | A | 160 | Good |
| Polyester/cotton blend fabric | A | 160 | Good |
| Cotton twill fabric | B | 160 | Fair |
| Polyester/cotton blend fabric | B | 90 | Good |
| Cotton twill fabric | C | 135 | Good |
| Polyester/cotton blend fabric | C | 135 | Good |

*Description of solutions used:
A - THP-cyanamide adduct [62 parts THP, 21 parts cyanamide (50%), 18 parts formalin, 90 parts H₂O, heated for 10 min.]; 40 parts of adduct mixed with 5 parts hexamethylene diisocyanate, and 15 parts DMF.
B - THP-cyanamide adduct [62 parts THP, 21 parts cyanamide (50%), 18 parts formalin, 90 parts H₂O, heated for 10 min.]; 40 parts of adduct mixed with 5 parts toluene diisocyanate and 15 parts DMF.
C - THP-cyanamide adduct [62 parts THP, 21 parts cyanamide (50%), 18 parts formalin, 90 parts H₂O, heated for 10 min.]; 40 parts of adduct mixed with 5 parts phenyl isocyanate and 15 parts DMF.

EXAMPLE 3

A solution containing 15 parts THP, 15 parts toluene diisocyanate, and 70 parts DMF was steam heated to evaporate the solvent, then heated in oven at 155° C for 30 minutes which resulted in the formation of clear, pale yellow, hard polymer which resisted burning when exposed to flame and formed a black char. Polymer was insoluble in water and ethanol.

EXAMPLE 4

A solution containing 15 parts THP, 15 parts phenyl isocyanate, and 70 parts DMF was steam heated to evaporate the solvent, then heated in oven at 155° C for 30 minutes which resulted in the formation of clear, pale yellow, hard polymer which resisted burning when exposed to flame and formed a black char. Polymer was insoluble in water and ethanol.

EXAMPLE 5

A THP-cyanamide adduct was produced by heating for 10 minutes a solution containing 62 parts THP, 21 parts of 50% cyanamide, 18 parts formalin, and 90 parts H₂O. Forth parts of this adduct was mixed with 5 parts of hexamethylenediisocyanate, and 15 parts of DMF. The solvent was evaporated from the solution by heating with steam, then the mixture was heated in an oven at 155° C for 30 min. to form a clear, pale yellow, hard polymer which resisted burning when exposed to flame, and formed a black char. Polymer was insoluble in water and ethanol.

EXAMPLE 6

Forty parts of the THP-cyanamide adduct which was prepared as shown in Example 5, was mixed with 5 parts of toluene diisocyanate and 15 parts DMF. The solution was steam heated to evaporate the solvent then heated in an oven at 155° C for 30 minutes to form a yellow, brittle, porous polymer which resisted burning when exposed to flame and formed a black char. Polymer was insoluble in water and ethanol.

EXAMPLE 7

Forty parts of the THP-cyanamide adduct which was prepared as shown in Example 5, was mixed with 5 parts of phenyl isocyanate, and 15 parts DMF. The solution was steam heated to evaporate the solvent then heated in an oven at 155° C for 30 minutes to form a clear, pale yellow, hard polymer which resisted burning when exposed to flame and formed a black char. Polymer was insoluble in water and ethanol.

We claim:

1. The polymers produced by mixing toluenediisocyanate and a soluble methylol phosphine adduct, prepared by reacting tris(hydroxymethyl)phosphine with an essentially monomeric amide or amine which adduct contains structures of the group consisting of $(HOCH_2)_mP(CH_2N)_n$ where $m$ and $n$ are integers of one or two and the sum of $m + n$ is 3, in solution with dimethylformamide and polymerizing about from 28° C to about 150° C for periods of time ranging about from 24 hours to about 3 minutes, the longer periods of time being used in conjunction with the lower temperatures, and the shorter periods of time with the higher temperatures.

2. The polymer produced in claim 1 wherein the isocyanate used is phenylisocyanate.

3. The polymer produced in claim 1 wherein the isocyanate used is hexamethylenediisocyanate.

* * * * *